United States Patent [19]
Belcher et al.

[11] Patent Number: 5,920,287
[45] Date of Patent: Jul. 6, 1999

[54] RADIO LOCATION SYSTEM FOR PRECISELY TRACKING OBJECTS BY RF TRANSCEIVER TAGS WHICH RANDOMLY AND REPETITIVELY EMIT WIDEBAND IDENTIFICATION SIGNALS

[75] Inventors: Donald K. Belcher, Rogersville, Tenn.; John A. Eisenberg, Los Altos; David S. Wisherd, Sunnyvale, both of Calif.

[73] Assignee: Widata Corporation, Sunnyvale, Calif.

[21] Appl. No.: 08/786,232

[22] Filed: Jan. 21, 1997

[51] Int. Cl.⁶ .................................................. G01S 3/02
[52] U.S. Cl. ........................ 342/450; 342/463; 342/465; 375/200
[58] Field of Search .................................. 342/450, 463, 342/465; 375/207, 200

[56] References Cited

U.S. PATENT DOCUMENTS 5,119,104  6/1992  Heller ........................................ 342/450
5,742,635  4/1998  Sanderford, Jr. ........................ 375/200

*Primary Examiner*—Mark Hellner
*Attorney, Agent, or Firm*—Charles E. Wands

[57] ABSTRACT

An asset management radio location system uses time-of-arrival differentiation for random and repetitive spread spectrum, short duration pulse 'blinks' from object-attached tags, to provide a practical, continuous identification of the location of each and every object within an environment of interest, irrespective whether the object is stationary or moving. Correlation-based RF processors determine which signals received by tag transmission readers are first-to-arrive signals as transmitted from any blinking tag, and an object location processor carries out time-of-arrival differentiation of these first-to-arrive transmissions from any blinking tag to determine where the respective object is located within the environment. A low power interrogation wand may be employed to refine the location of an object by a user programmed transmission-response exchange between the wand and the tag associated with the object of interest.

34 Claims, 7 Drawing Sheets

RADIO LOCATION SYSTEM FOR PRECISELY TRACKING OBJECTS BY RF TRANSCEIVER TAGS WHICH RANDOMLY AND REPETITIVELY EMIT WIDEBAND IDENTIFICATION SIGNALS

FIELD OF THE INVENTION

The present invention relates in general to object location and tracking systems, and is particularly useful in tracking applications, such as asset management systems, where continuous identification of the locations of a variety of objects is desired. In particular, the invention is directed to an RF energy-based object tracking system, which, using correlation processing to accurately identify a first-to-arrive burst from a tag, and a multilateration algorithm, is able to precisely identify the locations of objects. Each object is 'tagged' with a micro-miniaturized radio transmitter unit, that repetitively and randomly 'blinks' or transmits a spread spectrum signal encoded with information representative of the identification of the object and auxiliary parameter data, such as that provided by an external sensor.

BACKGROUND OF THE INVENTION

The Heller U.S. Pat. No. 5,119,104, entitled: "Location System Adapted for Use in Multipath Environments," describes a motion-based object tracking system, proposed for use in a multipath environment, such as a semiconductor manufacturing facility, where objects such as integrated circuit wafer boxes are transported among various (processing, inspection and testing) sites by way of an intra plant conveyor. In accordance with the system proposed in the Heller patent, the objects (e.g., wafer boxes) are 'tagged' with micro-miniaturized radio TAG transmitters. The operation of a respective TAG is triggered by a motion sensor.

When the wafer box is stationary, the TAG's radio transmitter is in a power-save or quiescent mode, in order to prolong the life of the battery used for the TAG's transmitter circuit. When the wafer box is moved, however, the motion sensor initiates a transmit mode of operation of the TAG, in response to which the TAG's transmitter begins emitting a radio signal encoded with the identification of the tag, and continues to do so in a repetitive and random manner, as long as the object/box is moving.

Using multilateration receivers distributed throughout the monitored area of interest and referenced to a common time base for a time-of-arrival determination processor, the location of a respective TAG and its associated box can be tracked as the box is being moved, up to the point where it is again at rest at the next downstream station. The TAG then reverts to the quiescent or power-saver mode, where transmission is disabled until the box is again moved.

One of the principal shortcomings of the motion-dependent object tracking system proposed in the Heller patent is the fact that, in addition to being motion-dependent, the disclosed system does not effectively solve the problem of multipath inputs to its tracking receiver subsystem, contrary to what the patent alleges, since its receivers are relatively simple amplitude detection devices that operate on the premise that the strongest signal is the first-to-arrive signal. This means that the Heller approach will erroneously identify a later arriving, relatively large amplitude, multipath signal that may have passed through an open window and reflected off a highly reflective surface, such as a nearby water tower, without significant attenuation, over a relatively weak, but first-to-arrive signal, that has travelled in a direct path from the TAG to the receiver, but has had to pass through an attenuating medium, such as a wall to reach the receiver.

A further shortcoming of the object tracking system proposed in the Heller patent is the fact that it is not concerned with the more fundamental problem of asset management. Asset management not only addresses the need to locate and track processed components in the course of their travel through a manufacturing and assembly sequence, but is also concerned with the more general problem of component and equipment inventory control, where continuous knowledge of the whereabouts of any and all assets of a business, factory, educational, military or recreational facility, and the like, is desired and/or required. Moreover, an asset management system may benefit from status information that can be provided to the tag by means of an auxiliary sensor associated with the tag, something not address by the Heller scheme.

SUMMARY OF THE INVENTION

In accordance with the present invention, the above-described problems of the Heller are successfully remedied by means of a spread spectrum-based radio location system, which provides a practical, continuous identification of the location of each and every object of interest, in a manner that is effectively independent of the amplitudes of the received signals, whether the object is stationary or moving, or whether two or more tags are transmitting at the same time.

For this purpose, the system employs a plurality of tag burst emission readers, that are geographically distributed within and/or around an asset management environment that contains the objects/assets, whose location is reported to an asset management data base. Associated with each object is a tag containing a tag transceiver, which randomly and repetitively transmits or 'blinks' a spread spectrum RF signal burst encoded with the identification of the object and auxiliary parameter data, such as that provided by an external sensor, and stored in tag memory.

Spread spectrum signals emitted by a tag and detected by a respective reader are coupled to an associated correlation-based RF signal processor to determine which spread spectrum signal received by the reader is the first-to-arrive signal from that tag—namely, that burst which has travelled over the closest observable path from the tag to the reader. As each reader can be expected to receive multiple signals having different amplitudes and times of arrival, due to multipath effects caused by the burst emitted by the tag being reflected off various objects/surfaces between the tag and the reader, the use of correlation signal processing ensures identification of the first observable transmission, which is the only signal containing valid timing information from which a true determination can be made of the distance from the tag to the reader.

This constitutes a significant improvement with respect to the system proposed in the Heller patent which, as noted above, does not effectively solve the problem of multipath inputs to its tracking receiver subsystem. In the Heller system, the disclosed receivers do not use spread spectrum correlation signal processing, but instead employ relatively simple amplitude detection devices that operate on the premise that the strongest signal is the first-to-arrive signal.

An object-location processor to which the identified first-to-arrive signals from at least three readers are applied employs a multilateration algorithm that employs a weighted average of the readers' received signals, to compute the location of the object. In addition to using the first-to-arrive signals from the readers to determine object location, the object-location processor also reads whatever data has been read out of the tag's memory and superimposed on the tag burst. The tag's location and parameter data are then downloaded to an asset management database processor.

The asset management database is separate from and arranged to be interfaced with the tracking system described above, which allows the format of object data displayed by a processor linked to the database may be readily customized for each user's application. The database may be maintained in a conventional personal computer, that is programmed to display both object location and parameter data in a form customized for the user's application.

To accommodate a change in elevation of a tagged object, the data stored in tag memory may be augmented by altimetry data, such as that provided by a change in elevation detector, which updates the contents of tag memory which information representative of whether the elevation of the tag has increased or decreased over some period of time. This allows the tag memory to keep a running count representative of the current elevation of the tag referenced to a starting point—when the tag was initially place in service with an object being tracked.

Because the object tracking system of the present invention has the capability of determining the location of a tag to a very good practical accuracy for asset management applications (e.g., to within only a few feet), it can provide an indication of a floor change within a multi-story buildings, by placing an interrogating reader in vertical transport area, such as a portal, stairwell. The interrogating reader causes a tag in the elevation change region to transmit at a relatively high frequency (e.g., once per second). This will allow the reader to determine, from altimeter data in successive ones of the tag's data bursts, whether the elevation of the tag is increasing or decreasing as the tag is travelling along the stairway.

DETAILED DESCRIPTION

Figure 1:
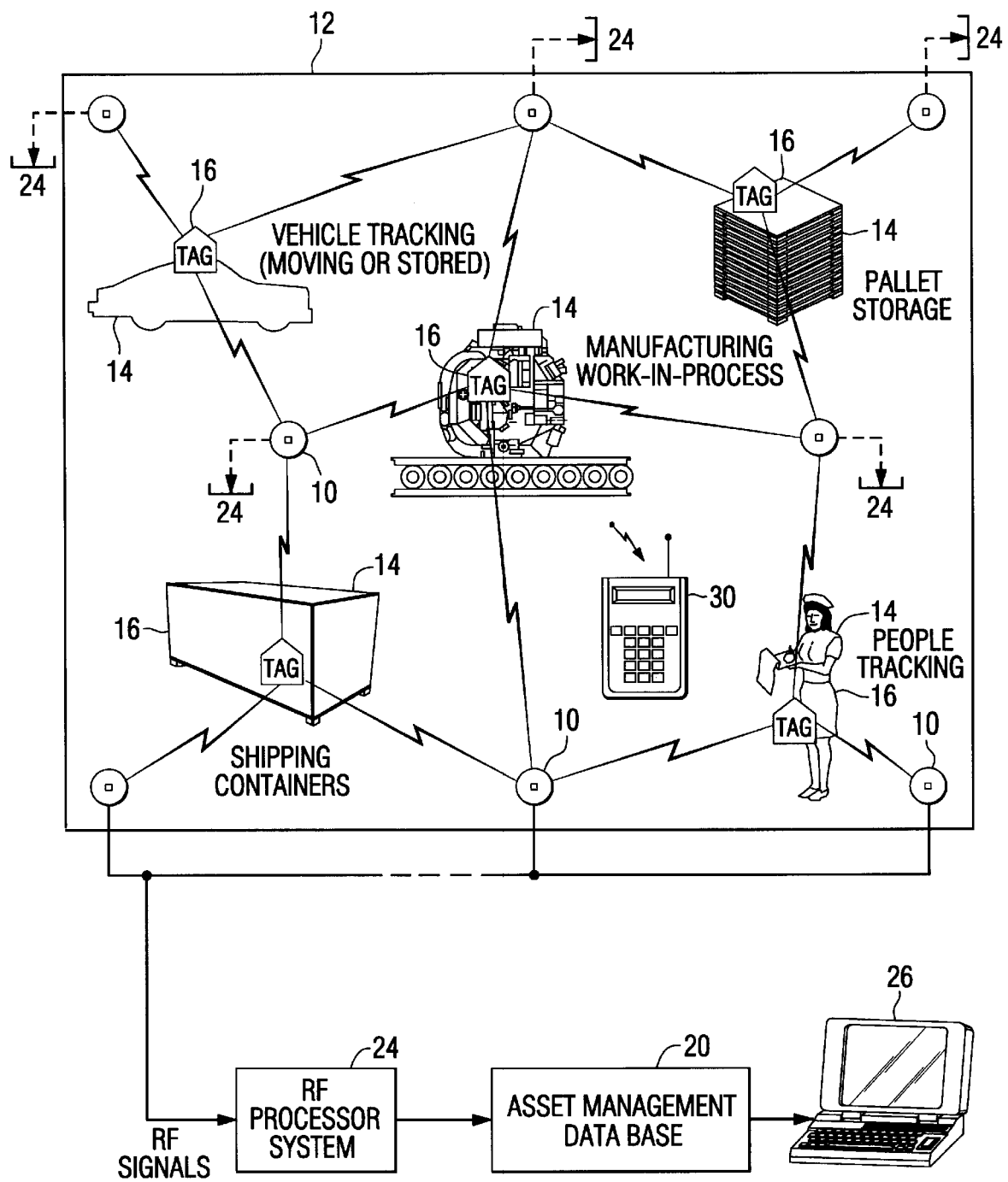
FIG. 1 diagrammatically illustrates the general architecture of a tagged object tracking and location system in accordance with the present invention.

Before describing in detail the new and improved spread spectrum correlation-based, tagged object radio location system in accordance with the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

The general architecture of the tagged object location system in accordance with the present invention is diagrammatically illustrated in FIG. 1 as comprising a plurality of tag emission readers 10, which are geographically distributed within and/or around a prescribed asset management environment 12 containing a plurality of objects/assets 14, whose locations are to be monitored on a continuous basis and reported to an asset management data base 20, which is accessible by way of a standard computer workstation or personal computer, as shown at 26. Each reader is operative to monitor the asset management environment for emissions from one or more tags 16 each of which is affixed to an object to be tracked.

A respective tag 16 transmits or 'blinks' a very short duration, wideband (spread spectrum) pulse of RF energy encoded with information, such as that representative of the identification of the object, and other object-associated information stored in memory. As a non-limiting example, where the object is a perishable, high value product, such as wine, drugs or other temperature sensitive material, such associated status information may comprise temperature data supplied by a temperature sensor installed within or external to the tag. Each tag 16 repeatedly transmits a spread spectrum encoded RF signal in a random manner, so that from an RF observation standpoint, a plurality of such tagged objects within the monitored environment may be considered akin to the random 'blinking' of a field of fireflies.

For purposes of providing a non-limiting example, the monitored environment 12 will be assumed to correspond to an electronic system engineering and testing facility, in which the assets/objects 14 to be tracked include various types of design, measuring and testing equipment, such as personal computers, personal digital assistants, signal generators, oscilloscopes, and the like, that are available for use by engineering and other technical personnel in the course of the design, testing and manufacture and assembly of the components of an electronic signal processing system.

The tag emission readers 10 (to be described below with reference to FIG. 5), may be installed at relatively unobtrusive locations within and/or around the perimeter of the monitored environment, such as doorway jams, ceiling support structures, etc. As will be described, each reader 10 is coupled to an associated reader output processor of an RF processing system 24, which is operative to correlate the (spread spectrum) signals received from a tag with a set of spread spectrum reference signal patterns, and thereby determine which spread spectrum signals received by the reader is a first-to-arrive spread spectrum signal burst transmitted from the tag.

The first-to-arrive signals extracted by the reader output processor from inputs supplied from a plurality of readers 10 are coupled to an object location processor, within processing system 24, which carries out time-of-arrival differentiation of these detected first-to-arrive transmissions, and thereby locates the tagged object of interest within the monitored environment 12 to within a prescribed spatial resolution (e.g., on the order of ten feet).

In order for the asset management database 20 to have a practical benefit, such as providing an indication of the effective utilization (percent usage per unit time) of the objects (e.g., equipment) being tracked, it is desirable that the location and other relevant parameter data associated with each object and stored in the database be updated at some reasonable repetition rate or frequency, thereby enabling plant supervisory personnel to make reasonably fully informed decisions with respect to the disposition and usage of the objects.

To satisfy this objective and yet minimize battery power consumption, each RF pulse autonomously emitted by a respective tag comprises a very short (e.g., 100 millisecond) duration, wide bandwidth (spread spectrum) pulse, having a repetition rate that varies with the application (from tens of seconds to several hours, for example). The interval between pulses and the number of tags used in a particular application are selected to minimize the probability of collisions (two or more tags transmitting at the same time). Though highly unlikely, should a collision occur, due to the random retransmission times, there is a high degree of certainty that information from the tags whose transmissions collided will be received at the tag's next transmission time, so that the system database will be updated in a period covering at most two transmission intervals.

The net result of each tag emission being of short duration and repeated with relatively long intervals between bursts is that the tag's transmitter spends most of its time in a powered down mode, yet does not go extended periods of time without 'blinking'. As noted earlier, this is in contrast to the motion-dependent scheme proposed in the Heller patent, which requires object motion in order for the tag to transmit. Such a system is unsuitable for an asset management system, that requires current location and status information of any and all objects regardless of whether the objects are moving or not.

Figure 2:
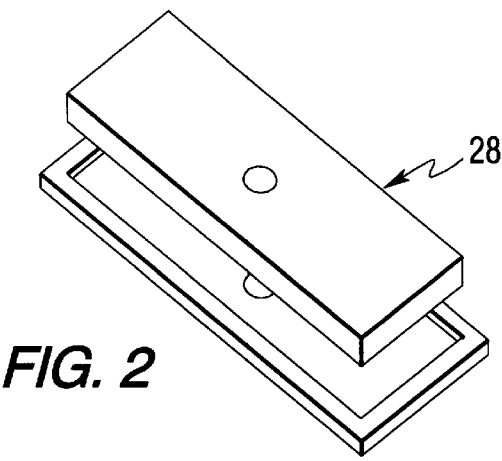
FIG. 2 is an exploded perspective view of a module for housing tag circuitry and affixable to an object to be tracked by the system of FIG. 1.

As diagrammatically illustrated in exploded perspective view of FIG. 2, the tag circuitry may be housed in a relatively compact, sealed transceiver module 28, which is sized to accommodate installation of a transceiver chip and one or more relatively long-life, flat-pack batteries and sensor devices. As a non-limiting example, the module may be rectangularly shaped, having a volume on the order of slightly more than one cubic inch, which allows the tag to be readily affixed to a variety of objects to be tracked.

Figure 3:
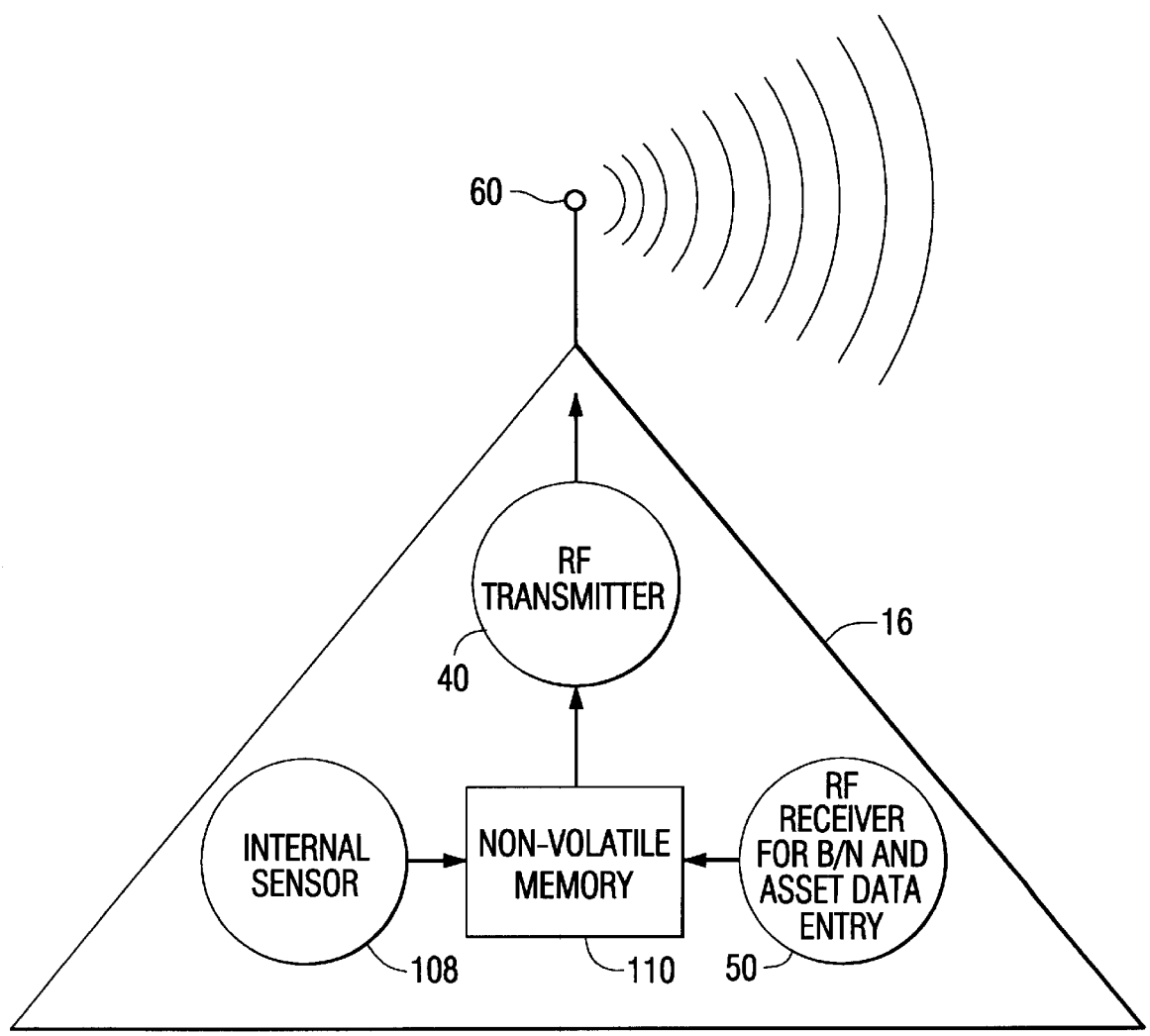
FIG. 3 is a general functional diagram of a tag transceiver unit employed in the radio location and tracking system FIG. 1.
Figure 4:
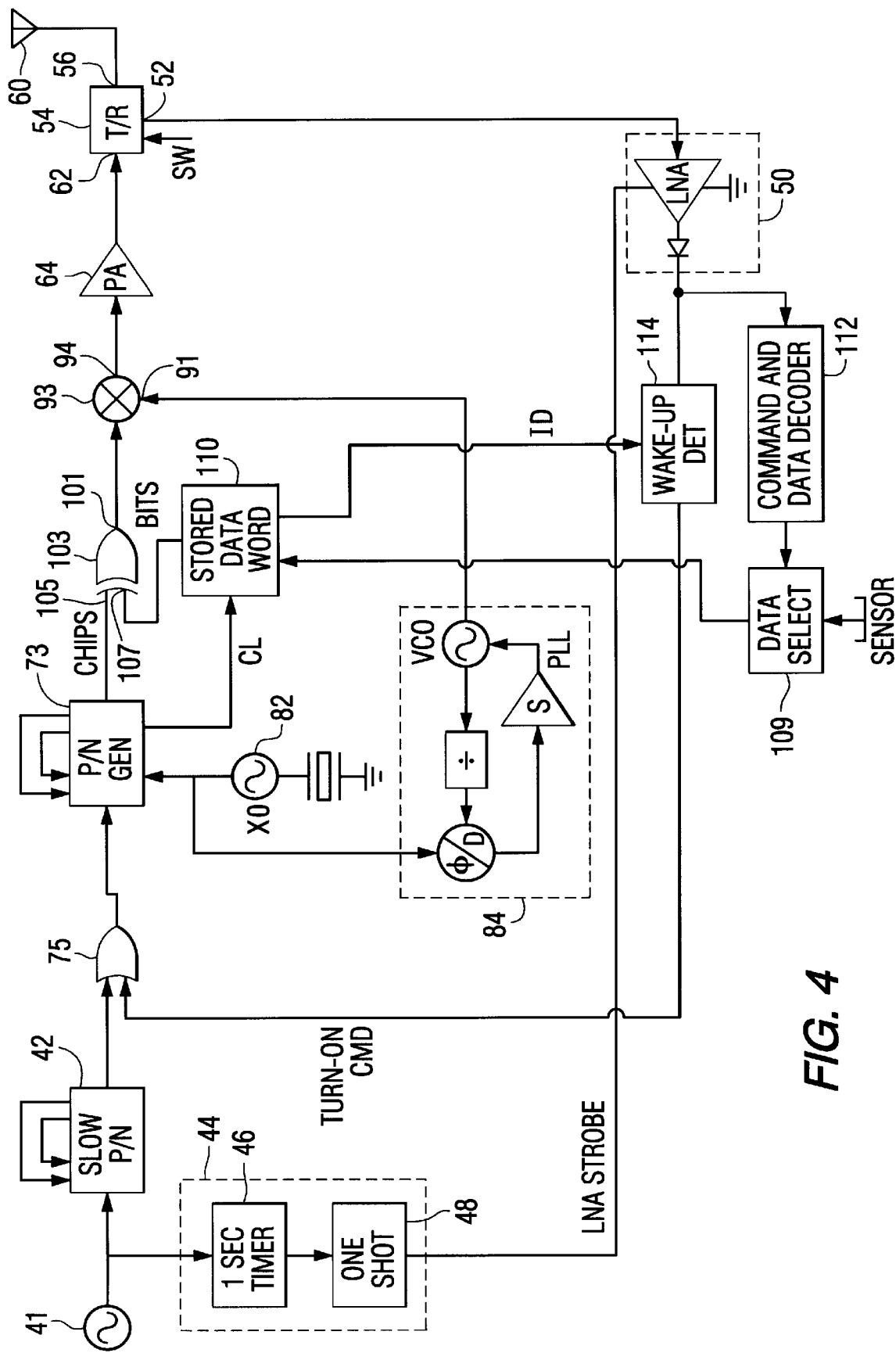
FIG. 4 shows the circuitry architecture of the tag transceiver unit of FIG. 3.

The general functional architecture of a tag transceiver (transmitter-transponder) unit employed in the radio location and tracking system of the present invention is diagrammatically illustrated in FIG. 3 and the circuit components thereof are shown in detail in FIG. 4. For sourcing signals to be transmitted by an RF transmitter section 40, the tag transceiver may comprise a relatively coarse oscillator 41, whose output is fed to a first 'slow' pseudo random pulse generator 42 and to a strobe pulse generator 44. As a non-limiting example, oscillator 41 may be implemented by means of a relatively inexpensive RC oscillator, which is sensitive to environmental parameter (e.g., temperature) variations and thus further minimizes the likelihood that any two tags will transmit simultaneously.

Strobe generator 44 comprises a timer 46 having a prescribed time-out duration (e.g., one-second) and a (one-shot) delay circuit 48, the output of which is a low energy (e.g., several microamps) receiver enable pulse having a prescribed duration (e.g., one-second wide). This pulse is used to controllably enable or strobe a relatively short range receiver 50, such as a crystal video detector, which requires a very insubstantial amount of power compared to other components of the tag. Because the receiver enable pulse is very low power, it does not effectively affect the tag's battery life.

The duration of the receiver enable pulse produced by the strobe pulse generator 42 is defined to ensure that any low power interrogation or query signal generated by a transceiver, such as a battery-powered, portable interrogation unit, to be described, will be detected by the crystal video receiver 50. As a relatively non-complex, low power device, crystal video receiver 50 is responsive to queries only when the interrogating unit is relatively close to the tag (e.g., on the order of ten to fifteen feet). This prevents the interrogator wand from stimulating responses from a large number of tags; as described above, signal strength measurement circuitry within the interrogator wand may be used to provide an indication of the proximity of the queried tag relative to the location of the interrogator wand.

In order to receive interrogation signals from the interrogating unit, the receiver 50 has its input coupled to a receive port 52 of a transmit-receive switch 54, a bidirectional RF port 56 of which is coupled to an antenna 60. Transmit-receive switch 54 has a transmit port 62 thereof coupled to the output of an RF power amplifier 64, that is powered up only during the relatively infrequent transmit mode of operation of the tag, as will be described.

The output of the 'slow' pseudo random pulse generator 42 is a series of relatively low repetition rate (for example, from tens of seconds to several hours, as described above), randomly occurring 'blink' pulses that are coupled to a high speed PN spreading sequence generator 73 via an OR gate 75. These blink pulses define when the tag will randomly transmit or 'blink' bursts of wideband (spread spectrum) RF energy to be detected by the system readers, in order to locate and identify the tag using time-of-arrival geometry processing of the identified first-to-arrive signals, as described above.

In response to an enabling 'blink' pulse, the high speed PN spreading sequence generator 73 generates a prescribed spreading sequence of PN chips. The PN spreading sequence generator 73 is driven at the RF frequency output of a crystal oscillator 82. This crystal oscillator provides a reference frequency for a phase locked loop (PLL) 84, which establishes a prescribed output frequency (for example a frequency of 2.4 GHz, to comply with FCC licensing rules). The RF output of PLL 84 is coupled to a first input 91 of a mixer 93, the output 94 of which is coupled to the RF power amplifier 64. Mixer 93 has a second input 95 coupled to the output 101 of a spreading sequence modulation exclusive- OR gate 103. A first input 105 of exclusive-OR gate 101 is coupled to receive the PN spreading chip sequence generated by PN generator 73. A second input 107 of OR gate 101 is coupled to receive the respective bits of data stored in a tag data storage memory 110, which are clocked out by the PN spreading sequence generator 73.

As a non-limiting example, tag memory 110 may comprise a relatively low power, electrically alterable CMOS memory circuit, which serves to store a multibit word or code representative of the identification of the tag. Memory circuit 110 may also store additional parameter data, such as that provided by an associated sensor (e.g., a temperature sensor) 108 installed on or external to the tag, and coupled thereto by way of a data select logic circuit 109. Data select logic circuit 109 is further coupled to receive data that is transmitted to the tag by means of an interrogation message from an interrogating unit, as decoded by a command and data decoder 112, which is coupled in circuit with the output of crystal video receiver 50. Data select logic circuit 109 is preferably implemented in gate array logic and is operative to append any data received from a wand query or an external sensor to that already stored in memory 110. It may also selectively couple sensor data to memory, so that the tag will send only previously stored data. It may also selectively filter or modify data output by the command and data decoder 112, as received from an interrogating wand.

When a query transmission from an interrogation wand 30 is detected, the tag's identification code stored in memory 110 is coupled to a 'wake-up' comparator 114. Comparator 114 compares the tag identification bit contents of a received interrogation message with the stored tag identification code. If the two codes match, indicating receipt of a wand query message to that particular tag, comparator 114 generates an output signal. This output signal is used to cause any data contained in a query message to be decoded by command and data decoder 112, and written into the tag memory 110 via data select logic circuit 109. The output of comparator 114 is coupled through OR gate 75 to the enable input of PN generator 73, so that the tag's transmitter will generate a response RF burst, in the same manner as it randomly and repeatedly 'blinks' a PN spreading sequence transmission containing its identification code and any parameter data stored in memory 110, as described above.

Figure 5:
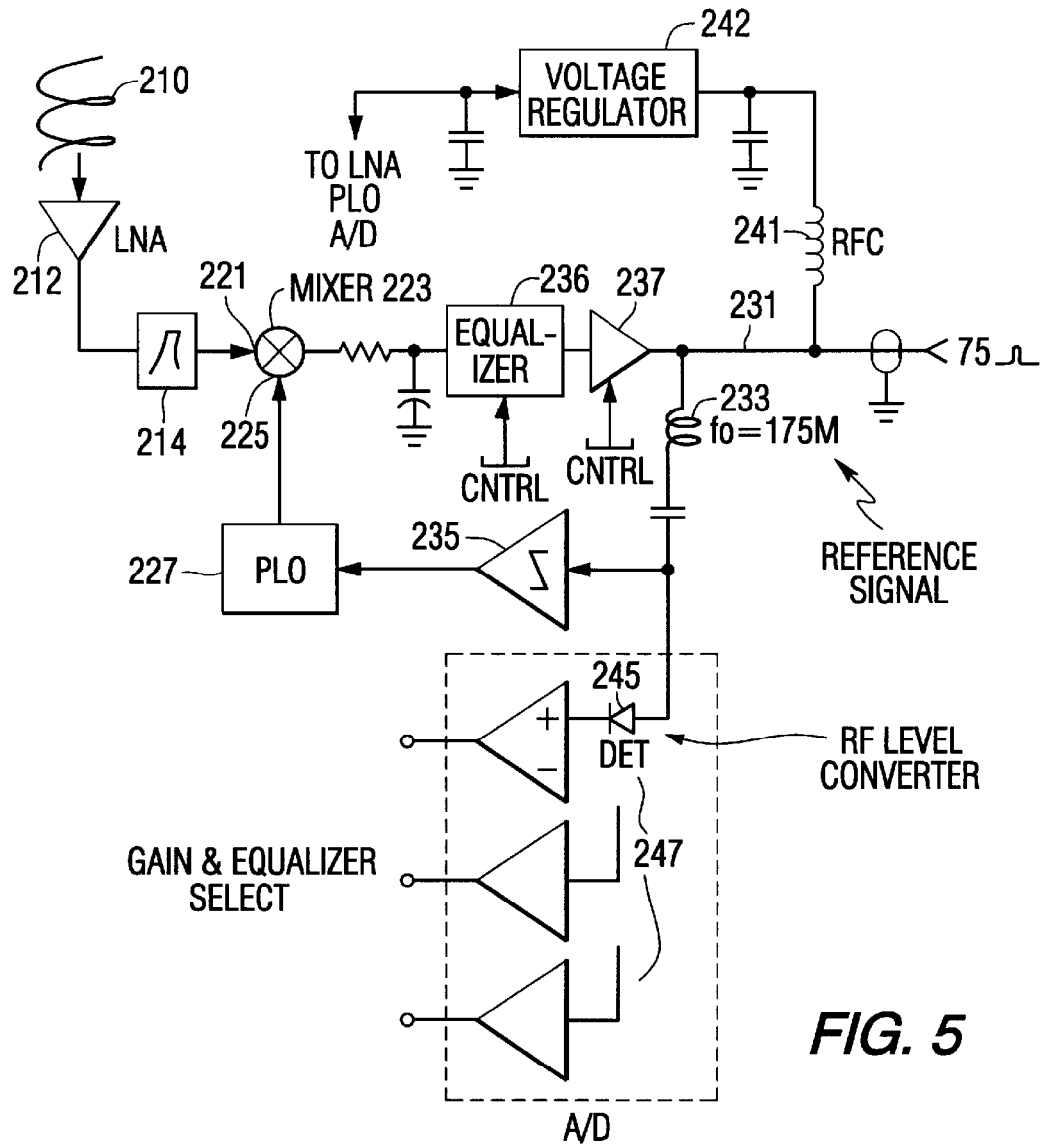
FIG. 5 diagrammatically illustrates the circuitry configuration of a respective tag reader.

FIG. 5 diagrammatically illustrates the circuitry configuration of a respective tag reader. Each reader includes an antenna 210 for sensing transmission bursts from a respective tag. The reader antenna, which is preferably omnidirectional and circularly polarized, is coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

In particular, a respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 to the communication signal processor. The communication cable 231 also supplies DC power for the various components of the reader by way of an RF choke 241 to a voltage regulator 242, which supplies the requisite DC voltage for powering the oscillator, power amplifier and analog-to-digital units of the reader.

The amplitude of the (175 MHZ) reference frequency supplied by the communications control processor to the phase locked local oscillator 227 implies the length of the communication cable 231 between the processor and the reader. This magnitude information can be used as control inputs to equalizer 236 and current amplifier 237, so as to set gain and/or a desired value of equalization, that may be required to accommodate the length of the communication cable. For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 6:
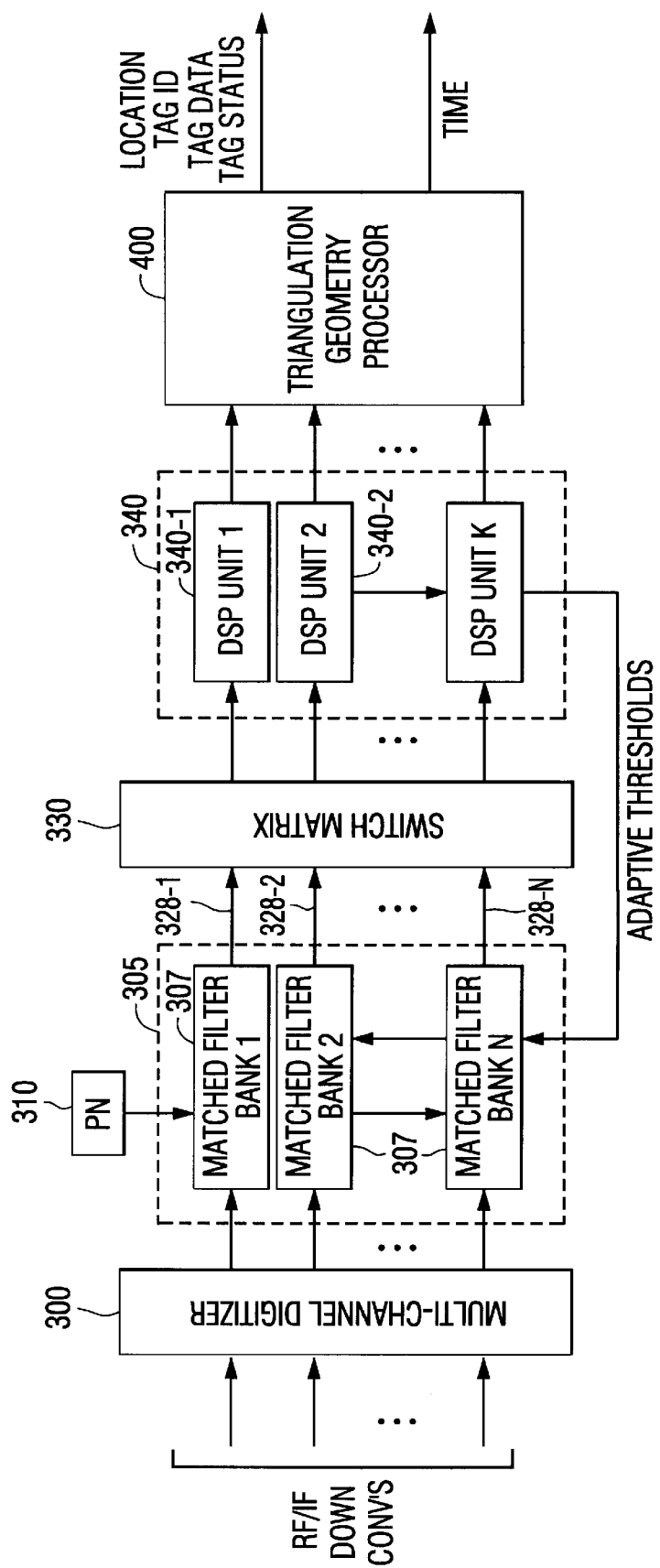
FIG. 6 diagrammatically illustrates the architecture of a correlation-based, RF signal processor to which the output of a respective RF/IF conversion unit of a tag reader is coupled.

FIG. 6 diagrammatically illustrates the architecture of a correlation-based, RF signal processor to which the output of a respective RF/IF conversion unit of FIG. 5 is coupled. As described briefly above, the correlation-based RF signal processor is operative to correlate spread spectrum signals detected by its associated reader with successively delayed or offset in time (by a fraction of a chip) spread spectrum reference signal patterns, and to determine therefrom which spread spectrum signal received by the reader is the first-to-arrive. Namely, it is that transmission from the tag that has travelled over the closest observable path between the tag and the reader.

As pointed out above, each reader can be expected to receive multiple signals from the tag due to multipath effects caused by the signal transmitted by the tag being reflected off various objects/surfaces between the tag and the reader. The correlation scheme of the invention ensures identification of the first observable transmission, which is the only signal containing valid timing information from which a true determination can be made of the distance from the tag to the reader.

Figure 7:
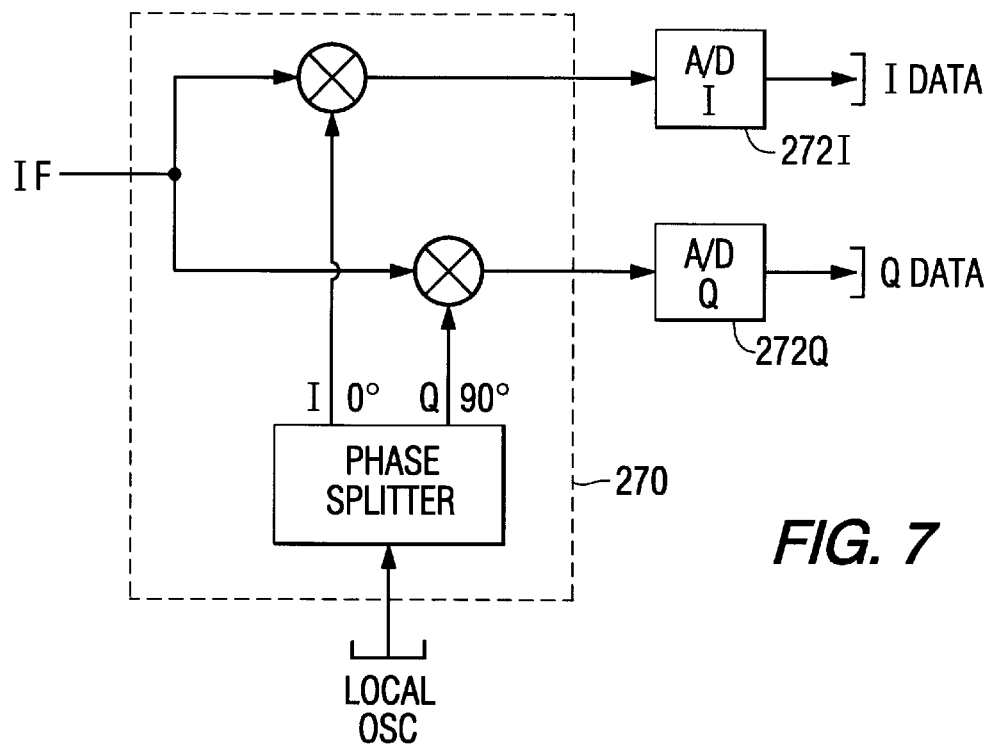
FIG. 7 diagrammatically illustrates IF-baseband downconverter and digitizer circuitry of a multi-channel digitizer of FIG. 6.

For this purpose, as shown in FIG. 6, the RF processor employs a front end, multi-channel digitizer 300, diagrammatically illustrated in FIG. 7 as comprising a quadrature IF-baseband downconverter 270 for each of an N number of the readers 10. The quadrature baseband signals are digitized by associated analog-to-digital converters (ADCs) 272I and 272Q. Digitizing (sampling) the reader outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components, so as to maximize performance and minimize cost.

This provides an advantage over bandpass filtering schemes, which require either higher sampling rates or more expensive ADCs that are capable of directly sampling very high IF frequencies and large bandwidths. Implementing such an approach would entail a second ASIC to provide the requisite interface between the ADCs and the correlators. In addition, baseband sampling requires only half the sampling rate per channel of bandpass filtering schemes.

Figure 8:
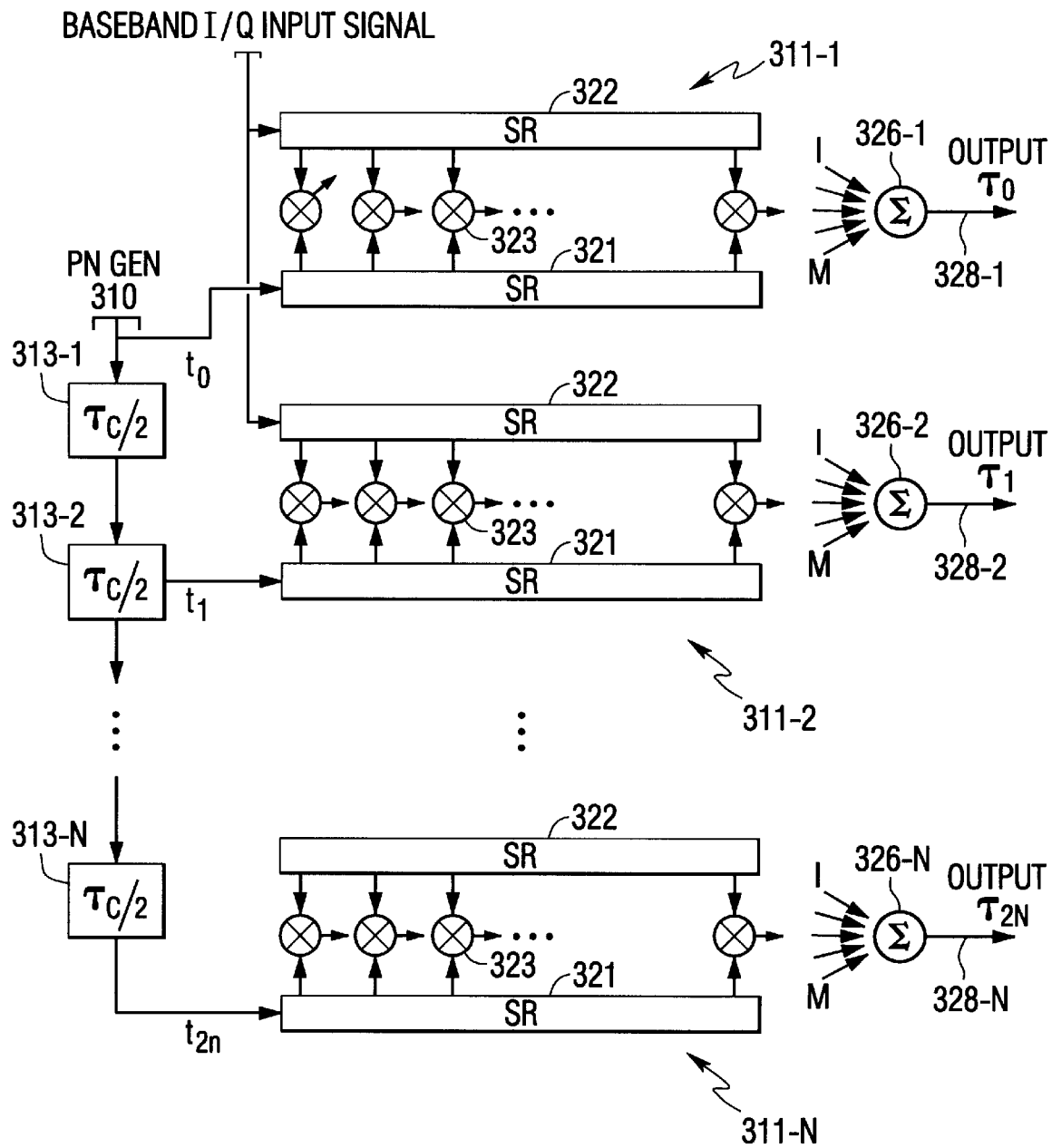
FIG. 8 diagrammatically illustrates the parallel correlator architecture of a matched filter bank of the correlation-based, RF signal processor of FIG. 6.

The matched filter section 305 may contain a plurality of matched filter banks 307, each of which is comprised of a set of massive parallel correlators. This functional architecture of such a set of massive parallel correlators is diagrammatically shown in FIG. 8, as comprising a PN code generator 310, which produces a PN spreading code (identical to that produced by the PN spreading sequence generator 73 within the tag described above). In the functional signal flow architecture of FIG. 8, the PN spreading code produced by PN code generator is supplied to a first correlator unit 311-1 and a series of delay units 313-1, . . . , 313-N, outputs of which are coupled to respective ones of the remaining correlators 311-2, . . . , 311-N. Each delay unit 313-i provides a delay equivalent to one-half a chip.

The functional architecture of a respective correlator unit 311 includes a first M stage shift register 321 (where M is the number of chips in the PN spreading sequence), through which a respective one of the successively delayed versions of the PN spreading sequence produced by PN generator 310 is clocked. The digitized reader baseband output signal is coupled to a second shift register 322 of each of the respective correlator units. The respective M stages of the first and second shift registers 321 and 322 of each correlator 311-i are applied to M respective multipliers of sets of multipliers 323. The M output products produced by the M multipliers 323 of the respective multiplier sets are summed in respective N summing units 326-1, . . . , 326-N, to produce N correlation values at correlator output ports 328-1, . . . , 328-N.

As a non-limiting example, the matched filter correlators may be sized and clocked to provide on the order of $4 \times 10^6$ correlations per epoch. By continuously correlating all possible phases of the PN spreading code with the incoming signal, the correlation processing architecture of FIG. 8 effectively functions as a matched filter, continuously looking for a match between the reference spreading code sequence and the contents of the incoming signal. Each correlation output port 328 is compared with a prescribed threshold that is adaptively established by a set of 'on-demand' or 'as needed' digital processing units 340-1, 340-2, . . . , 340-K of FIG. 6. That one of the correlator outputs 328 having a summation value exceeding the threshold identifies which delayed version of the PN spreading sequence is effectively aligned (to within half a chip time) with the incoming signal.

This signal is applied to a switching matrix 330, which is operative to couple a 'snapshot' of the data on the selected channel to a selected digital signal processing unit 340-i of the set of digital signal processing units 340. Since the tags will 'blink' or transmit randomly, and can be statistically quantified, the number of potential simultaneous signals over a processor revisit time will determine the number of such 'on-demand' digital signal processors required. Each processor scans the raw data supplied to the matched filter and the initial time tag. The raw data is scanned at fractions of a chip rate using a separate matched filter as a co-processor, so as to produce an autocorrelation in both the forward (in time) and backwards (in time) directions around the initial tag detection output for both the earliest (first observable path) detection and other buried signals. The output of the digital processor is the first path detection time tag, threshold information, and the amount of energy in the signal produced at each reader's input which is supplied to and processed by the time-of-arrival-based multilateration processor section 400.

Processor section 400 employs a standard multilateration algorithm that relies upon time-of-arrival inputs from at least three detectors to compute the location of the object. For this purpose, the algorithm may be one which uses a weighted average of the readers' received signals. In addition to using the first observable signals from the readers to determine object location, the processor also reads the data read out of the tag's memory and superimposed on the tag transmission. The object position and parameter data are then downloaded to a tag data base where object information is maintained.

Since the asset management database is separate and is arranged to be interfaced with the tracking system described above, the format of object data displayed by a processor linked to the asset management database may be readily customized for each user's application. Such a database may be maintained in a conventional personal computer, programmed to display both location and parameter data in a form customized for the user's application. As a non-limiting example, where the tag is used to track items in an industrial facility, the data may be displayed on a floor plan map of that facility in such a manner as to facilitate the user's assimilation of information relating to the items being tracked, such as equipment/part movement, employee activity, item orientation, temperature, vibration, emergency signalling, etc.

Figure 9:
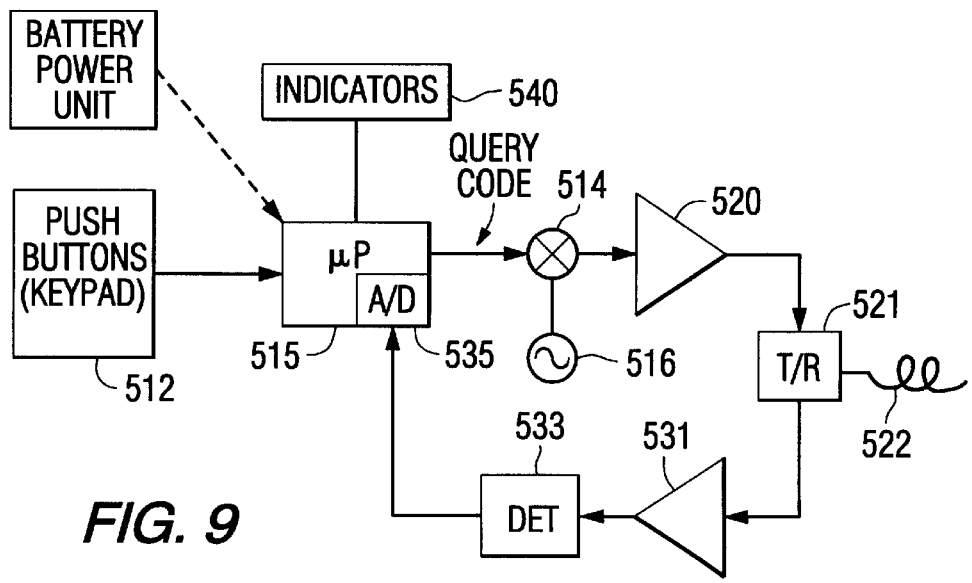
FIG. 9 illustrates the circuit architecture of an interrogator wand usable in the system of FIG. 1.

As described previously, since each tag possesses the ability to receive information, albeit limited, the content of its memory can be modified by the use of a (hand held, battery-powered) interrogator unit, such as a transceiver wand, pictorially illustrated at 30 in FIG. 1, and the circuit architecture for which is shown in FIG. 9. As shown therein the interrogator wand 30 includes a relatively low power, short range transmitter unit 510, that is selectively operative by the user to stimulate a queried tag to transmit its short duration spread spectrum energy burst, that is otherwise randomly generated on a relatively low repetition rate basis by the PN code generator 73 in the tag's transceiver unit, as described above with reference to FIG. 4.

Because it is relatively low power and has no significant processing gain, the interrogator wand 30 is intended to be used for only relatively short range queries (e.g., on the order of ten to fifteen feet). Its typical use is to more precisely pinpoint the location of a tagged object, whose location within the monitored environment, as determined by processor section 400, may fall within a resolution of ten feet or so. An example is an industrial facility, and the like, where a plurality of objects that are stored/distributed within a relatively confined physical plant, such as multiple storage bins distributed among multiple aisles of a parts storage warehouse. Where the object of interest is relatively small and is mixed in with a number of the same type of objects whose physical separation is closer than such coarse resolution, inventory personnel can take the interrogator wand to the initially identified area, and query the target object from that location.

Namely, the interrogator wand 30 must be reasonably close to the tag of interest, in order to stimulate a response, and thereby geographically refine the location of a tagged object, that has been initially located and tracked by virtue of its random, repetitive encoded spread spectrum emissions, described above. Thus, the low power emission from the interrogator wand 30 both prevents it from stimulating responses from a large number of tags, and allows the measurement of signal strength response to locate the proximity of the queried tag relative to the interrogating wand.

As shown in FIG. 9, the (battery powered) portable interrogator wand includes a mechanical user interface (keypad) 512, through which the user may program various information, such as that for identifying a particular tag and for altering the contents of the specified tag's memory, as described above. Keypad 512 is coupled to a control processor (microcontroller) 515, which generates a query code sequence that uniquely identifies one of the tags within the operating environment of the system. Such a code sequence may comprise a limited duration (e.g., on the order of one second) continuously repeating, Manchester encoded, sixty-four bit tag identification code with a Barker code preamble, having a pulse repetition rate of 100 Kps, as a non-limiting example.

By transmitting a continuously repetitive code over a duration on the order of more than one second ensures that the wand's interrogation stimulus will arrive at the queried tag during a time window within which a strobe pulse is generated by the strobe pulse generator 44 of FIG. 4, described above. As pointed out previously this strobe pulse, which is used to controllably enable the tag's low noise RF receiver amplifier circuit 50, is defined to ensure that any interrogation signal generated by the interrogation wand will be received and recovered by the tag's transceiver.

This query code sequence is coupled to a mixer 514, which modulates an RF carrier provided by an RF oscillator 516, such as one producing an output frequency on the order of 2.4 GHz, and thereby complying with FCC license exception requirement 15.249. The mixer 514 drives an amplifier 520 with a modulated RF carrier signal containing the address or identification of the tag transceiver of interest. The output of amplifier 520 is coupled to a transmit/receive switch 521, ported to an antenna 522, such as a unidirectional antenna to facilitate the location process, which emits a relatively low power RF signal for interrogating the particular tag identified by the query code sequence that has been accessed by a keyed input to the microcontroller 515.

Once the interrogation burst has been transmitted from the interrogator wand, the transmit/receive switch 521 reverts to the receive mode in anticipation of receiving a response spread spectrum energy burst from the queried tag of interest. As pointed out above, like a randomly 'blinked' transmission, this response message will include an identification of the tag and whatever parameter data is stored in the tag's memory. Any such response burst from the tag received by the interrogator wand is amplified by an amplifier 531 and applied to a relatively non-complex energy detector 533, such as a square law diode detector, the output of which is digitized (by an associated analog-to-digital converter 535) and coupled to microcontroller 515. By measuring the signal strength of the response signal, microcontroller is able to provide an indication of the proximity of the queried tag relative to the wand. For this purpose, the wand's microcontroller may also be coupled to provide a visual indication on an associated output display, such as an LCD display panel 540, which displays various parameter data associated with the operation of the wand and return data from the interrogated tag.

Figure 10:
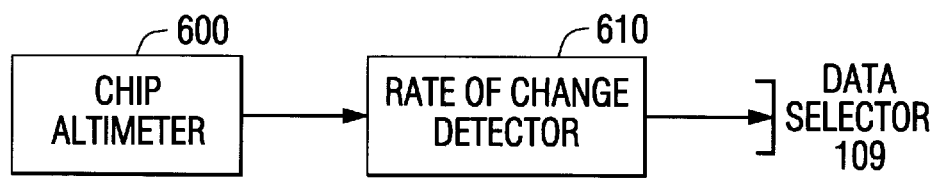
FIG. 10 diagrammatically illustrates an altimeter and rate of change detector, which may couple auxiliary elevation data to the tag memory.

In the object tracking system of the present invention, described above, the multilateration algorithm executed by the processing section 400 locates a tagged object in terms of a common plane that presumably contains the readers and the object. In a practical asset management environment, such as a multi-storey building, however, the objects and the readers may be located in a variety of different planes. To accommodate this practical reality, the data stored in a respective tag memory (shown at 110 in FIG. 4) may be augmented by altimetry data supplied from a relatively inexpensive, commercially available altimeter circuit, as diagrammatically illustrated at 600 in FIG. 10.

Although the absolute accuracy of such a circuit may not be sufficient to determine altitude to within a few feet relative to sea level, by coupling its output to a rate of change detector circuit 610 as a further sensor input to tag memory, the tag is able to store data representative of whether the elevation of the tag has increased or decreased over some period of time (as define by the rate of change circuit 610). This allows the tag memory 110 to keep a running count representative of the current elevation of the tag referenced to a starting point, when the tag was initially place in service with an object being tracked.

Figure 11:
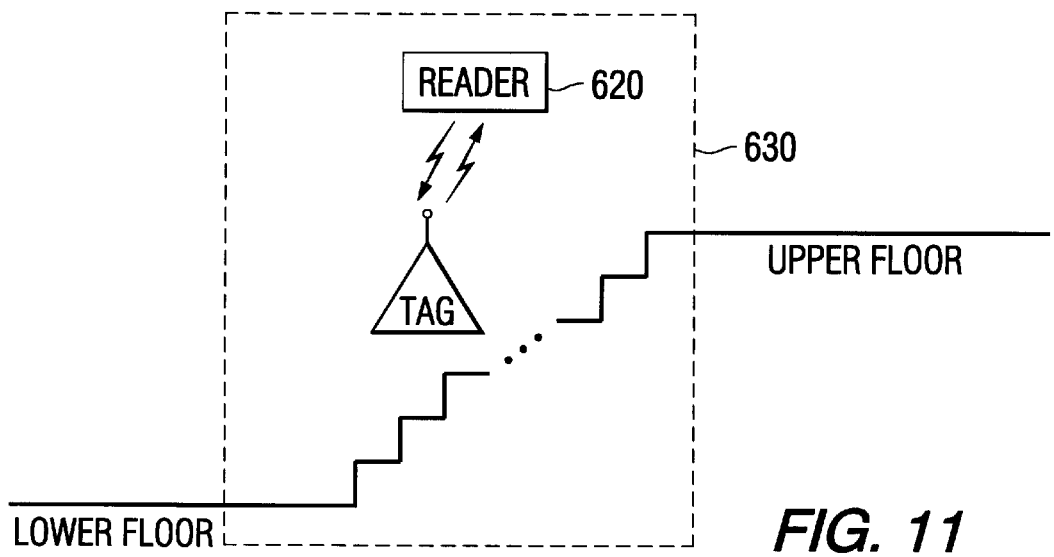
FIG. 11 diagrammatically illustrates an interrogating reader positioned in the vicinity of an elevation change region (stairwell) for detecting if the elevation of the tag is increasing or decreasing as the tag is travelling through the elevation change region.

It will also be appreciated that multi-storey buildings are generally accessed through stairwells and elevators. Because the object tracking system of the present invention has the capability of determining the location of a tag to an accuracy of only a few feet, it can provide an indication of a floor change, if a reader is situated in the immediate area through which the tag is transported. For this purpose, as diagrammatically in FIG. 11, a reader 620 positioned in the vicinity of an elevation change region (e.g., portal or stairwell) 630 may be augmented with an interrogating emitter, such as that used in the interrogating wand described above.

Such an interrogating emitter is operative to cause a tag in the elevation change region 630 to transmit at a relatively high frequency (e.g., once per second), so as to allow the reader to determine, from the altimeter data in successive ones of the tag's data bursts, if the elevation of the tag is increasing or decreasing as the tag is travelling along the stairway. In the case of a multi-storey building, it may thus be determined whether the object to which the tag is affixed has been transported up or down some number of floors.

As will be appreciated from the foregoing description, the above-described inability of the object tracking system proposed in the Heller patent to deal with the general problem of asset management in a variety of applications is successfully addressed by the radio location system of the present invention, which uses time-of-arrival differentiation for random and repetitive wideband (spread spectrum), short duration pulse transmissions (blinks) from object-attached tags, to provide what is effectively a practical, continuous identification of the location of each and every object within a monitored environment of interest, irrespective whether the object is stationary or moving. Correlation-based RF processors determine which signals received by tag transmission readers are first-to-arrive signals as transmitted from any blinking tag, and an object location processor carries out time-of-arrival differentiation of these first-to-arrive transmissions from any blinking tag to determine where the respective object is located within the environment. The use of a low power interrogation wand allows refinement of the location of an object by a user programmed transmission-response exchange between the wand and the tag associated with the object of interest.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A system for identifying locations of objects within a monitored environment, using time-of-arrival differentiation for transmissions from tags disposed with said objects, as detected at a plurality of spaced apart tag transmission readers for said monitored environment comprising:

for each of said objects, a respective tag disposed therewith containing a tag transmitter which is operative to randomly and repetitively transmit, irrespective of motion of said each object and in a random and repetitive manner that does not depend upon whether said each object is in motion or is stationary, a pseudo random spread spectrum RF signal encoded with information representative of the identification of said each object, and wherein said tag transmission readers are operative to detect pseudo random spread spectrum RF signals transmitted by said each object;

reader output processors coupled to said plurality of tag transmission readers, each reader output processor comprising a correlation-based RF signal processor that is operative to correlate pseudo random spread spectrum RF signals detected by its associated tag transmission reader with spread spectrum reference signal patterns, and thereby determine which pseudo random RF spread spectrum signals received by said plurality of tag transmission readers are first-to-arrive pseudo random spread spectrum RF signals as transmitted from said respective tag, and wherein said correlation-based RF signal processor comprises a matched filter correlator, having a plurality of matched filter banks containing parallel correlators, which are operative to correlate a received pseudo random spread spectrum RF signal with successive time offset versions of a reference pseudo random spreading code corresponding to that of said pseudo random spread spectrum RF signals transmitted by said respective tag; and an object location processor which is coupled to said reader output processors and is operative to carry out time-of-arrival differentiation of said first-to-arrive transmissions from said respective tag, as detected by said plurality of tag transmission readers, so to locate said respective tag and its associated object within said environment.

2. A system according to claim 1, wherein said respective tag includes memory which stores a multibit word representative of the identification of said object and additional parameter data provided to said memory, and wherein said tag transmitter is operative to randomly and repetitively transmit said pseudo random spread spectrum RF signal encoded with said information representative of the identification of said object and said additional parameter data.

3. A system according to claim 1, wherein said tag transmitter comprises a pseudo random spreading sequence generator, which randomly and repetitively generates a pseudo random spreading sequence modulating an RF carrier for transmission by said tag, and a pseudo random pulse generator, which is operative to cause said pseudo random spreading sequence generator to randomly and repetitively generate said pseudo random spreading sequence modulating said RF carrier for transmission by said tag.

4. A system according to claim 1, wherein said respective tag contains a tag transceiver, that includes said tag transmitter and a tag receiver, and a timing circuit which is operative to periodically enable said tag receiver.

5. A system according to claim 4, wherein said respective tag further includes memory, which is arranged to store a multibit word representative of the identification of said object and information received by said tag receiver.

6. A system according to claim 5, wherein said tag transmitter includes a pseudo random spreading sequence generator, which randomly and repetitively generates a pseudo random spreading sequence modulating an RF carrier for transmission by said tag with information stored in said memory, and wherein said tag transmitter is operative to transmit said spread spectrum signal encoded with information stored in said memory, in response to said tag receiver detecting a signal identifying said respective tag.

7. A system according to claim 4, further including an interrogator unit containing a relatively low power transmitter that is selectively operative to transmit a query signal to said tag receiver, said query signal causing said respective tag to transmit said signal encoded with information representative of the identification of said each object, as received by said tag receiver.

8. A system according to claim 7, wherein said interrogator unit is operative to repetitively transmit a query code sequence, which uniquely identifies said respective tag, over a duration sufficient to include periodic enabling of said tag receiver by said timing circuit.

9. A system according to claim 8, wherein said interrogator unit includes a receiver that is operative to receive a response signal encoded with information representative of the identification of said each object.

10. A system according to claim 9, wherein said interrogator unit is operative to determine the proximity of said object relative to said interrogator unit in accordance with signal strength of said response signal.

11. A system according to claim 1, wherein a respective tag transmission reader is configured to provide DC power for circuitry of said reader in accordance with energy contained in a detected signal transmitted by said respective tag.

12. A system according to claim 1, wherein said correlation-based RF signal processor comprises a digital signal processor, which processes signals supplied to said matched filter correlator and said first-to-arrive signals to identify the time of arrival of said first-to-arrive signals at a respective reader, and the amount of energy in the signal produced said reader's input for application to said object-location processor.

13. A system according to claim 12, wherein said object-location processor is operative to locate each object in accordance with a geometry algorithm that relies upon time-of-arrival inputs from at least three spatially separated tag transmission readers to compute the location of said object.

14. A system according to claim 9, wherein said respective tag further includes memory, which stores a multibit word representative of the identification of said object and auxiliary information, and wherein said object-location processor is operative to couple, to an asset management data base, data that has been read out of said memory of said respective tag and included in said signal transmitted by said tag.

15. A system according to claim 1, wherein said tag includes memory which stores a multibit word representative of the identification of said object and elevation data associated with said object, and wherein said tag transmitter is operative to transmit a spread spectrum signal encoded with information representative of the identification of said each object and said elevation data.

16. A system according to claim 15, wherein said elevation data is representative of a change in elevation of said object.

17. A system according to claim 15, wherein a tag transmission reader is operative to monitor transmission of said object and elevation data transmitted by said tag transmitter so as to enable said object location processor to determine a change in elevation of said object.

18. A method for locating objects within a monitored environment, using time-of-arrival differentiation for transmissions from tags associated with said objects, as detected at a plurality of spaced apart tag transmission readers for said monitored environment, comprising the steps of:

(a) irrespective of motion of an object, causing its associated tag to randomly and repetitively transmit in a random and repetitive manner that does not depend upon whether said object is in motion or is stationary, a pseudo random spread spectrum signal encoded with information representative of the identification of said object;

(b) processing, by correlation-based RF signal processors, signals detected at said plurality of spatially separated tag transmission readers, each of which is operative to detect pseudo spread spectrum RF signals transmitted by said tags of said objects, to determine which signals received by said plurality of tag transmission readers are first-to-arrive signals as transmitted from said associated tag, each correlation-based RF signal processor being operative to correlate pseudo random spread spectrum RF signals detected by its associated tag transmission reader with spread spectrum reference signal patterns, and thereby determine which pseudo random RF spread spectrum signals received by said plurality of tag transmission readers are first-to-arrive pseudo random spread spectrum RF signals as transmitted from said associated tag, and wherein said correlation-based RF signal processor comprises a matched filter correlator, having a plurality of matched filter banks containing parallel correlators, which are operative to correlate a received pseudo random spread spectrum RF signal with successive time offset versions of a reference pseudo random spreading code corresponding to that of said pseudo random spread spectrum RF signals transmitted by said associated tag; and (c) conducting time-of-arrival differentiation of said first-to-arrive signals to locate said associated tag and thereby said object within said environment.

19. A method according to claim 18, wherein said associated tag includes memory which stores a multibit word representative of the identification of said object and additional parameter data, and wherein step (a) comprises randomly and repetitively transmitting a spread spectrum signal encoded with said information representative of the identification of said object and said additional parameter data.

20. A method according to claim 18, wherein step (a) comprises randomly and repetitively transmitting RF carrier modulated with a pseudo random spreading sequence that is generated in a random manner in accordance with a relatively slow pseudo random pulse sequence.

21. A method according to claim 18, further including the step of (c) providing a tag receiver and periodically enabling said tag receiver to be capable of receiving query signals to said tag.

22. A method according to claim 21, further including the step of (d) providing memory with said tag and storing in said memory a multibit word representative of the identification of said object and information received by said tag receiver, and wherein step (a) comprises randomly and repetitively modulating an RF carrier with a pseudo random spreading sequence with information stored in said memory, in response to said tag receiver receiving a signal identifying said respective tag.

23. A method according to claim 22, further including the step of (d) providing a portable transceiver unit and transmitting therefrom a query signal to said tag receiver, and causing said tag to transmit said signal encoded with information stored in said memory.

24. A method according to claim 23, wherein step (d) comprises causing said portable transceiver unit to repetitively transmit a query code sequence, which uniquely identifies said respective tag, over a duration sufficient to include said periodically enabling of said tag receiver.

25. A method according to claim 24, wherein step (d) further includes receiving, at said interrogator unit, a response signal transmitted by said tag and encoded with information representative of the identification of said object.

26. A method according to claim 23, wherein step (d) further includes determining the proximity of said object relative to said interrogator unit in accordance with signal strength of said response signal.

27. A method according to claim 18, wherein step (c) comprises conducting time-of-arrival differentiation of said first-to-arrive signals in accordance with a geometry algorithm that relies upon time-of-arrival inputs from at least three spatially separated tag transmission readers to compute the location of said object.

28. A method according to claim 18, wherein said tag further includes memory, which stores a multibit word representative of the identification of said object and auxiliary information, and wherein step (c) further comprises coupling to an asset management data base data that has been read out of said memory of said respective tag and imparted to said signal encoded with information representative of the identification of said object and transmitted by said tag in step (a).

29. A method for locating objects within a monitored environment, using time-of-arrival differentiation for transmissions from tags associated with said objects, as detected at a plurality of spaced apart tag transmission readers for said monitored environment, comprising the steps of:

(a) causing an object's associated tag to transmit, in a random and repetitive manner that does not depend upon whether or said object is in motion or is stationary a pseudo random spread spectrum RF signal encoded with information representative of the identification of said object, and wherein said tag transmission readers are operative to detect pseudo random spread spectrum RF signals transmitted by said object;

(b) processing signals detected at said plurality of spatially separated tag transmission readers, in reader output processors coupled to said plurality of tag transmission readers, each reader output processor comprising a correlation-based RF signal processor that is operative to correlate pseudo random spread spectrum RF signals detected by its associated tag transmission reader with spread spectrum reference signal patterns, and thereby determine which pseudo random RF spread spectrum signals received by said plurality of tag transmission readers are first-to-arrive pseudo random spread spectrum RF signals as transmitted from said respective tag, and wherein said correlation-based RF signal processor comprises a matched filter correlator, having a plurality of matched filter banks containing parallel correlators, which are operative to correlate a received pseudo random spread spectrum RF signal with successive time offset versions of a reference pseudo random spreading code corresponding to that of said pseudo random spread spectrum RF signals transmitted by said respective tag, and thereby determine which signals received by said plurality of tag transmission readers are first-to-arrive signals as transmitted from said associated tag;

(c) conducting time-of-arrival differentiation of said first-to-arrive signals to determine the approximate location of said associated tag and thereby said object;

(d) transmitting a query signal from a portable transceiver unit to said tag receiver, and causing said tag to transmit a response signal; and (e) detecting said response signal at said portable transceiver and processing said response signal to locate said associated tag and thereby said object.

30. A method according to claim 29, wherein step (d) comprises locating said object in accordance with the signal strength of said response signal.

31. A method for identifying locations of objects within a monitored environment, using time-of-arrival differentiation for transmissions from tags disposed with said objects, as detected at a plurality of spaced apart tag transmission readers for said monitored environment comprising the steps of:

(a) at each of said objects, randomly and repetitively transmitting, in a random and repetitive manner that does not depend upon whether said each object is in motion or is stationary a pseudo random spread spectrum RF signal encoded with information representative of the identification of said each object, and wherein said tag transmission readers are operative to detect pseudo random spread spectrum RF signals transmitted by said object;

(b) correlating spread spectrum signals detected by associated tag transmission readers with spread spectrum reference signal patterns, by means of a matched filter correlator, having a plurality of matched filter banks containing parallel correlators, which are operative to correlate a received pseudo random spread spectrum RF signal with successive time offset versions of a reference pseudo random spreading code corresponding to that of said pseudo random spread spectrum RF signals transmitted by said respective tag, and thereby determining which spread spectrum signals received by said plurality of tag transmission readers are first-to-arrive spread spectrum signals as transmitted from said respective tag; and (c) conducting time-of-arrival differentiation of said first-to-arrive transmissions from said respective tag, as detected by said plurality of associated tag transmission readers, so to locate said respective tag and its associated object within said environment.

32. A method according to claim 31, wherein said tag includes memory which stores a multibit word representative of the identification of said object and elevation data associated with said object, and wherein step (a) comprises transmitting a spread spectrum signal encoded with information representative of the identification of said each object and said elevation data.

33. A method according to claim 32, wherein said elevation data is representative of a change in elevation of said object.

34. A method according to claim 33, wherein a tag transmission reader is operative to monitor transmission of said object and elevation data transmitted by said tag transmitter so as to enable a change in elevation of said object to be determined in step (c).

* * * * *